United States Patent [19]
Lukens

[11] Patent Number: 5,997,724
[45] Date of Patent: Dec. 7, 1999

[54] METHOD OF MAKING A SHALE OIL MODIFIER

[75] Inventor: Larry A Lukens, Highlands Ranch, Colo.

[73] Assignee: The New Paraho Corporation, Boulder, Colo.

[21] Appl. No.: 08/877,334

[22] Filed: Jun. 16, 1997

Related U.S. Application Data

[62] Division of application No. 08/620,900, Mar. 25, 1996, Pat. No. 5,755,865.

[51] Int. Cl.⁶ .............................. C10G 7/00; C10G 7/06
[52] U.S. Cl. ............................... 208/94; 208/14; 208/92; 585/654; 585/655
[58] Field of Search ............................ 208/14, 92, 94; 585/654, 655

[56] References Cited

U.S. PATENT DOCUMENTS

| | | | |
|---|---|---|---|
| 4,325,738 | 4/1982 | Plancher et al. | 106/273 N |
| 4,592,828 | 6/1986 | Chu et al. | 208/89 |
| 4,948,468 | 8/1990 | Reeves et al. | 202/93 |

OTHER PUBLICATIONS

"Petroleum Products Handbook", Editor: Virgil B. Guthrie, p. 9–10, 1960, no month.

*Primary Examiner*—Walter D. Griffin
*Assistant Examiner*—Nadine Preisch
*Attorney, Agent, or Firm*—Swanson & Bratschun LLC

[57] ABSTRACT

A shale oil modifier is made of a crude shale oil dehydrogenated sufficiently to attain a viscosity of between about 1200–1800 poise at 60° C. The crude shale oil has sufficient basic nitrogen content so that the dehydrogenated crude shale oil exhibits non-Newtonian properties when mixed with asphalt cements. Preferably, the basic nitrogen content is about 2%–2.5% by weight. The shale oil modifier is made by a process which includes providing a crude shale oil and subjecting the crude shale oil to a two stage distillation followed by a vacuum distillation and collecting the residual fraction. The residual fraction is dehydrogenated with air until a select viscosity, preferably between about 1200–1800 poise at 60° C. is obtained.

4 Claims, 9 Drawing Sheets

| SOM Viscosity (poise @ 60°C) | Standard Deviation (poise @ 60°C) | |
|---|---|---|
| | ln mean average | lnln mean average |
| AC-10 Series: | | |
| 57.8 | 83.2 | 43.1 |
| 243.8 | 144.6 | 130.9 |
| 560.8 | 182.6 | 179.8 |
| 1357.9 | 242.6 | 242.1 |
| 3367.7 | 307.9 | 292.0 |
| AC-20 Series: | | |
| 57.1 | 176.0 | 91.6 |
| 228.0 | 236.3 | 196.2 |
| 519.6 | 281.2 | 264.5 |
| 1375.4 | 461.2 | 458.8 |
| 3317.9 | 641.4 | 634.8 |

METHOD OF MAKING A SHALE OIL MODIFIER

This is a divisional of application Ser. No. 08/620,900 filed on Mar. 25, 1996 now U.S. Pat. No. 5,755,865.

BACKGROUND OF THE INVENTION

1. Technical Field

The present invention is directed toward asphalt pavements, and more particularly toward an asphalt rejuvenater and an asphalt pavement composition including recycled asphalt pavement

2. Background Art

The following definitions will apply to terms used herein. Hot mix asphalt concrete ("HMAC") means an asphalt pavement for application to a roadbed. HMAC consists of three primary constituents: 1) aggregate of various geologic sources and sizes; 2) asphalt cement (or asphalt binder) which consists of asphaltine hydrocarbons; and 3) one or more modifiers to enhance water resistance or improve wear, and which could include shale oil modifier ("SOM") discussed in greater detail below. Recycled asphalt pavement (RAP) means HMAC which has been milled off an existing paved roadbed. HMAC containing RAP means hot mix asphalt concrete which includes recycled asphalt pavement During the past several years, the recycling of asphalt pavements has become a more commonly practiced and attractive pavement rehabilitation technique. In 1993, the U.S. Government reported that 91 million tons/year of recycled asphalt pavement ("RAP") were being produced in the U.S., of which 73 million tons/year were being recycled for highway applications.

There are several obvious benefits associated with pavement recycling. Typically, and from a cost point of view, the use of RAP results in a lower first cost of rehabilitation due to the savings realized from the reutilization of materials (i.e., aggregate and asphalt binder). From a structural engineering point of view, this technique permits the removal of all or a portion of the defects in the preexisting pavement, which defects might otherwise reduce the effectiveness and longevity of resurfacing treatments. Moreover, this technique permits the preservation of the surface geometry, which often is important in cases where changes in elevation cannot be tolerated or are too expensive to accommodate. Lastly, the reuse of the materials removed from the preexisting pavement offers certain environmental and conservation benefits through a reduction in the problems associated with the disposal of this material and through the utilization of the asphalt cement or asphalt binder content of the RAP.

The techniques presently used for the recycling of asphalt pavements commonly are classified as surface recycling, in-place surface and base recycling and central plant recycling. Surface recycling involves the application of a rejuvenating treatment to the surface of the existing pavement. In-place recycling refers to the removal and immediate replacement of some or all of the preexisting pavement. Central plant recycling, as the name implies, refers to the removal of some or all of the existing pavement to a central plant location, where all or a portion of this material is reprocessed with varying proportions of virgin aggregate and/or virgin binder and then reused for paving applications. Each of these techniques may employ either a hot or cold process.

The use of RAP presents several technical challenges. In this regard, the most likely reason that an asphalt pavement is in need of rehabilitation is due to the aged, or hardened, condition of its asphalt binder, which is manifested in the degradation of the rheological properties of the asphalt binder, in particular, an increase in viscosity. This condition reduces the pavements ability to resist the loss of adhesion between the binder and the aggregate and to resist cracking due to fatigue and thermal cycling. Hence, and in order for the preexisting pavement to be effective for reuse, some process must be devised to restore the rheological properties of the aged binder in the RAP to a condition that is more typical of an unaged, or virgin, binder. In the industry, the term of art that commonly is used to describe this process of restoration is "rejuvenation".

While several methods of rejuvenation have been devised and practiced, generally all involve the application of heat or the use of a rejuvenating agent. With regard to the latter, there are a myriad of products presently being marketed and used in the U.S., which products generally are classified as either flux oils, viscosity graded asphalt cements, emulsified asphalts or a host of brand-named products of proprietary formulation. The selection of the type and usage rate of these products, for the most part, is based on the properties of the aged asphalt in the RAP, the percentage of RAP to be used in the new mix, and the recycling technique to be employed.

There are certain problems inherent in the in-place methods. Absent the addition of significant quantities of virgin aggregate or virgin mix, the quantity of rejuvenating agent that can be added to the RAP without suffering a reduction in the stability and associated strength of the relaid HMAC containing RAP pavement is relatively small (i.e., typically less than 1% of the weight of the RAP). Stated differently, the asphalt content and aggregate gradation of the RAP often are such that very little, if any, rejuvenater can be added to the RAP without adversely affecting the void content, and thus the stability and strength, of the recycled mix Hence, it is not always possible to achieve the desired degree of rejuvenation when in-place methods of recycling are employed.

Furthermore, the degree of "apparent" rejuvenation that can be achieved with emulsified asphalts and many of the brand-named products is greater than the degree of rejuvenation demonstrated with low viscosity graded asphalt cements. The word "apparent" is used to reflect that the effectiveness of some of these products is reported to be temporary in nature, with little if any lasting effect on the restoration of the rheological properties of the aged asphalt. Nonetheless, in-place recycling methods typically employ some form of these products in an effort to effect the desired degree of rejuvenation.

When emulsified asphalts are used, care must be taken to ensure that the new mix has had sufficient time to "cure" before being subjected to traffic loading. While this problem can be mitigated through use of "rapid cure" emulsions, it is not uncommon for these recycled pavements to require several days, if not months, of curing before their maximum strengths are realized. In addition, caution must be exercised to ensure that the rejuvenating agent does not contain a high percentage of low boiling range volatiles, particularly when hot recycle processes are to be employed.

Because of these problems with in-place recycling techniques, central plant recycling techniques offer certain advantages, particularly with regard to mix design and quality control. Although the initial cost of central plant recycling may exceed that of in-place recycling techniques, if the problems associated with in-place recycling result in a pavement with reduced service life, then its advantage of lower first cost may be negated by the higher cost of future rehabilitation requirements.

One problem with central plant recycling techniques is that the addition of even low viscosity graded asphalt cements ("AC's") often fails to meet the objective of rejuvenating the Theological properties of the aged asphalt in the RAP to close to that of virgin asphalt. As a result, the viscosity of the binder in the recycled asphalt pavement is higher than desirable, leading to reduced resistance to thermal and fatigue cracking and reduced service life.

SUMMARY OF THE INVENTION

A composition for rejuvenating asphalt comprises between 5–25% by weight shale oil modifier ("SOM") and between 75–95% by weight asphalt cement. The asphalt cement may consist of an AC-10 binder or a AC-20 binder.

Another aspect of the invention is a HMAC containing RAP consisting of a rejuvenating composition comprising between 5–25% weight SOM and between 75–95% asphalt cement and an aggregate composition comprising between 30–40% RAP and between about 60–70% virgin aggregate. Preferably, the rejuvenating composition consists of about 10–20% by weight SOM and between about 80–90% by weight asphalt cement. The asphalt cement of the rejuvenating composition may be AC-10 binder or AC-20 binder, although other viscosity asphalt cements may be used as well.

Another aspect of the present invention is a method for rejuvenating aged asphalt pavement. A select thickness of an aged asphalt pavement of a portion of an existing roadbed is milled and collected. A shale oil modified asphalt comprising between about 5–25% SOM and 75–95% asphalt cement is provided. In addition, an aggregate comprising about 60–70% virgin aggregate and about 30–40% of the milled and collected RAP asphalt is provided. That shale oil modified asphalt and the aggregate are combined and then applied to the portion of the existing roadbed. The method may further include, after applying the mixture to the existing roadbed, applying a layer of a Plant Mix Wearing Course ("PMWC"), the PMWC comprising a shale oil modified asphalt comprising about 5–25% SOM and 75–95% asphalt cement and a virgin aggregate.

Another aspect of the present invention is a shale oil modifier made of dehydrogenated crude shale oil. The shale oil modifier exhibits non-Newtonian properties when mixed with asphalt cements. The crude shale oil which is dehydrogenated preferably comprises about an 80% fraction of whole crude shale oil. The basic nitrogen content of the shale oil is preferably between about 2–2.5 percent by weight. In a highly preferred embodiment, crude shale oil is extracted from shale oil mined from the Mahogany Zone of the Colorado Piceance Creek Basin of the U.S. Green River Formation.

Yet another aspect of the present invention is a shale oil modifier made by a process including the steps of providing a crude shale oil and subjecting the crude shale oil to a two stage distillation (i.e., atmospheric followed by vacuum distillation) and collection of the residual fraction. The residual fraction then is dehydrogenated until a select viscosity is achieved.

The shale oil modifier of the present invention has been shown to exhibit a non-Newtonian property when mixed with conventional asphalt cements. This non-Newtonian property, which is believed to be due to the thixotropic nature of the SOM, makes the SOM effective as a constituent in an asphalt rejuvenating composition. The SOM is a valuable product which sells for several times the price of an identical volume of crude shale oil. Because it can be made from a much larger fraction of whole crude shale oil than the asphaltine fraction (80% versus 5–7%), the quantity of SOM producible per volume of crude shale oil provides a high return on the crude shale oil starting materials.

The composition for rejuvenating asphalt of the present invention has been found to have a viscosity which is always significantly lower than the viscosity which would be expected on the basis of conventional blending laws. When mixed with the aged asphalt binder from RAP the resulting binder has a viscosity considerably lower than binders made from RAP binders and conventional asphalt cements. The degree of rejuvenation can approach or exceed the rheological properties of virgin asphalt binder. The restoration of the rheological properties (including the lower viscosity) in the RAP increases the service life of the resulting HMAC containing RAP through improved resistance to fatigue and thermal cracking and through reduced age hardening. In addition, these attributes are realized without sacrificing reduced service life due to rutting or moisture damage.

The method for rejuvenating asphalt according to the present invention results in an HMAC containing RAP having the many advantages discussed above.

DETAILED DESCRIPTION OF THE PREFERRED EMBODIMENT

As used herein, shale oil modified asphalt or SOMAT means a blend of a shale oil modifier or SOM and conventional asphalt cement ("AC"). In the preferred embodiment, as used herein, SOM means a compound manufactured from crude shale oil extracted from oil shale mined from the Mahogany Zone of the Colorado Piceance Creek Basin of the U.S. Green River Formation using direct-heated retorting technology developed by the assignee The New Paraho Corporation and described in U.S. Pat. No. 4,948,468, the disclosure of which is incorporated herein by reference. This crude shale oil has between about 2 and 2½% basic nitrogen by weight. The SOM is manufactured in a two-step process. The first step in the process is a simple two stage distillation (i.e., atmospheric followed by vacuum), whereby the lower boiling point fractions of the crude shale oil are removed, leaving a residual fraction with an initial boiling point of between approximately 260° C. (500° F.) and 290° C. (550° F.). The residual fraction is then dehydrogenated, or polymerized, by reacting the same with air at approximately 218 ° C. (425° F.) until the desired consistency of the material, as measured by its absolute viscosity, is reached. Other sources of oil shale may also produce SOM having the desirable properties disclosed herein. In addition, it may be possible to substitute other retorting technology and treatment processes for that described in U.S. Pat. No. 4,948,468 to extract crude shale oil from oil shales.

During field evaluation of SOMAT blends, it has been observed that the measured viscosity of a final SOMAT product is always lower than the measured viscosity of either the AC or SOM materials used in preparation of the SOMAT. This phenomenon is referred to as the "negative viscosity effect". Research has shown that the deviation between the actual and predicted viscosity values (i.e., the negative viscosity effect) is greatest when the SOMAT is comprised of approximately 20% SOM and 80% AC, by weight, and that in certain cases the viscosity of the SOMAT blend is less than the viscosity of either the AC or SOM materials from which the SOMAT blend is made.

The "negative viscosity effect" is attributable to the SOM, and the departure from the predicted viscosity is found to increase as the viscosity of the constituent SOM increases. This behavior is believed to be due to the thixotropic nature of the SOM. The thixotropic nature of the SOM is believed to be attributable in part to the characteristic of the shale oil from which the SOM is manufactured, including the relatively high basic nitrogen content (2–2½%) of the shale oil as compared to conventional petroleum feedstocks and the relatively wide boiling range (i.e., approximately 280° C.) of hydrocarbons associated with the large fraction (i.e., approximately 80%) of the whole crude shale oil as opposed to the much narrower boiling range of feedstocks typically used for airblown asphalts. The method of making the SOM is also believed to contribute to this behavior. More particularly, the use of air blowing results in polymerization by dehydrogenation with the evolution of water. Literature suggests that this reaction results in the conversion of oily constituents of the whole crude shale oil fraction to resins which, in turn, are converted to asphaltines. Research has shown that as the relative fraction of asphaltine constituents which make up the apshalts colloidal system increases, the thixotropic properties of the material are enhanced, which is turn increase the non-Newtonian nature of the material.

Generally the air blowing process, when applied to conventional petroleum feedstocks, results in asphalts demonstrating improved temperature susceptibility, but also can result in a deterioration in performance with regard to aging and adhesion. While improved temperature susceptibility is most desirable, and while the reduced aging and adhesion performance can be mitigated somewhat by proper feedstock selection, the use of airblown asphalts for paving applications, for the most part, has been discouraged.

As discussed in greater detail below, the inventor's experience with airblown shale oil materials represents a significant departure from that which generally is held to be true for airblown asphalts derived from conventional petroleum. Like conventional airblown asphalts, the use of airblowing on shale oil feedstocks also results in an improvement in the temperature susceptibility of the final SOM and associated SOMAT products. Unlike conventional airblown asphalts, however, there is no evidence which suggests that airblowing shale oil feedstocks results in a deterioration of the final products ability to resist aging, nor in its ability to resist moisture damage due to poor adhesion. To the contrary, both laboratory and actual field test results clearly show that pavements made with SOMAT demonstrate significant improvements in both aging and adhesion performance when compared to pavements made with conventional asphalts.

The results of a set of experiments conducted for the purpose of demonstrating the negative viscosity effect associated with the blending of shale oil modifiers (SOM's) with asphalt cements (AC's) derived from conventional petroleum feedstocks follows. The first step in these experiments was preparation of binary blends of different viscosity AC materials. The viscosity of these prepared blends was then measured and compared to the viscosity predictions provided by ln and lnln mean average correlations. A corresponding set of viscosity measurements and comparisons were then performed on a series of binary blends prepared from SOM materials of different viscosity. Finally, binary blends (i.e., SOMAT's) were then prepared using the same AC and SOM materials, the viscosity of which blends was then measured and again compared with the predicted values provided by the empirical ln and lnln mean average correlations.

It should be noted that the exposure of asphalts to air, albeit even for short periods of time, results in oxidation and a corresponding increase in the viscosity of the asphalt sample. Naturally, the degree of oxidation depends on the temperature of the sample, the length of time of exposure and the amount of sample surface area exposed. In an attempt to mitigate the effect of the exposure to air of the asphalts samples used in these experiments, a procedure was established to ensure that each sample was subjected to the same thermal environment and the same extent and time of exposure.

Sample preparation and viscosity measurements were conducted as follows: The bulk samples (i.e., typically one quart or one pint quantities) were placed in a convection oven, set at approximately 120° C. (250° F.), until the samples were sufficiently liquified to permit pouring during the presentation of the binary blends. While the time of this initial heating process varied form sample to sample, the same did not affect the results of the tests since the viscosity of each of the component materials was measured after this initial heating process occurred. The binary blends were prepared by pouring measured quantities, by weight, of each of the two components into a common sample container. Sample containers of the same size and configuration were used for all of the binary blends and the total sample quantity of each binary blend was held to 50 grams±1 gram in order to ensure the same surface-to-volume ratio for each sample. In addition, and at the same time the binary blends were prepared, 50 gram samples of each of the two components of the binary blends were poured. The sample containers were then covered and allowed to cool and remain at room temperature until such time as they were preheated in preparation for the viscosity measurements. No attempt was made to mix the binary blends at this time.

Prior to the start of the viscosity measurement procedure, each component and binary blend sample was preheated in a convection oven, set at approximately 120° C. (250° F.), for a period of 60 minutes. The sample remained covered during this preheating period, except for one minute periods at the end of 30 minutes and at the end of 60 minutes, during which the sample was stirred. At the end of the second one minute stirring period, the sample was immediately poured into viscometer tubes, which tubes previously had been placed in the constant temperature viscometer bath.

Using a Cannon-Manning, vacuum-type viscometer, duplicate viscosity measurements of each component were performed (i.e., by performing two separate viscosity measurements on each sample, poured at the same time from the same sample container into separate viscometer tubes) by use of the procedure set forth in ASTM D2171, with one exception. The one exception relates to the period of time between when the samples were poured into the viscometer tubes and the initiation of the actual viscosity measurement. ASTM D2171 specifies that the sample should be allowed to remain in the constant temperature bath, set at 60° C. (140° F.), for a period of 30 minutes prior to initiating the viscosity measurement, in order to ensure that the sample is in thermal equilibrium at 60° C. (140° F.). It has been the inventor's experience that a minimum of 60 minutes is required for this equilibrium condition to develop and, accordingly, 60 minutes was used for all of the measurements presented herein.

In accordance with the ASTM D2171 procedure, two viscosity readings were taken for each bulb of the viscometer tube (i.e., bulbs B and C), and the average of these two readings was recorded as the measured viscosity of the sample.

AC Blends

For this series of tests, four conventional asphalt cements from two commercial sources were selected: AC-10 and AC-20 viscosity graded asphalts obtained from the Sinclair Refinery, located at Sinclair, Wyo. and AC-10 and AC-20 viscosity graded asphalts obtained from the Frontier Refinery, located at Casper, Wyo. Binary blends of the Sinclair AC-10 and AC-20 materials and of the Frontier AC-10 and AC-20 materials were prepared and the viscosities of these blends and the AC-10 and AC-20 components were measured. The blends were prepared in approximately 20% increments (i.e., 0% AC-10/100% AC-20, 20% AC-10/80% AC-20 . . . 100% AC-10/0% AC-20), by weight.

Figure 1:
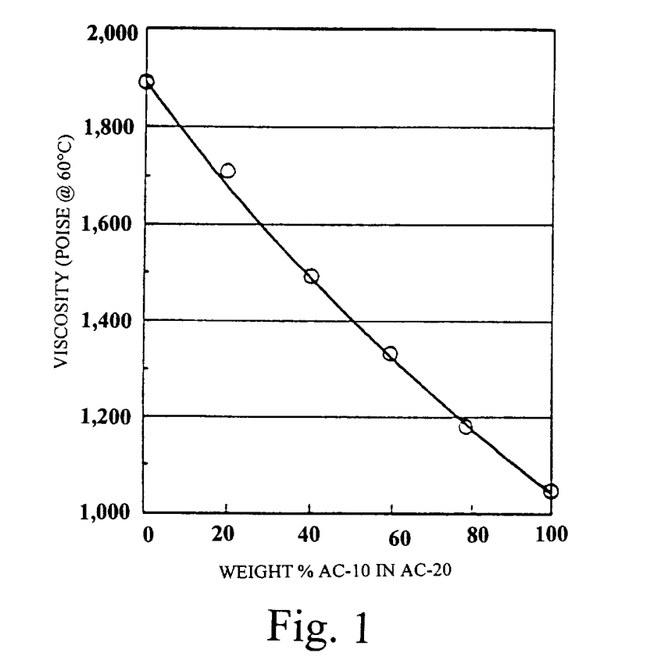
FIG. 1 is a graph of the ln mean average of the viscosity of various AC-10 and AC-20 asphalt concrete blends from a refinery in Sinclair, Wyo. as a function of the weight percentage of AC-10 in the blend compared with measured (○) viscosity at select blends.
Figure 2:
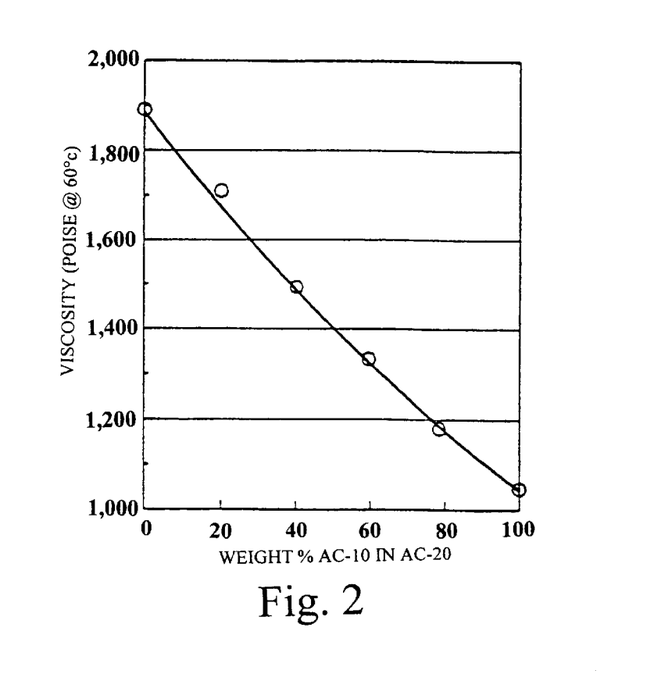
FIG. 2 is a graph of the lnln mean average of the viscosity of various AC-10 and AC-20 asphalt concrete blends from a refinery in Sinclair, Wyo. as a function of the weight percentage of AC-10 in the blend compared with measured viscosity (○) at select blends.

The results of the viscosity measurements on the Sinclair series of blends are shown in FIGS. 1 and 2. In FIG. 1, the measured viscosity values are compared to the correlation that results from use of the ln mean average formula, while FIG. 2 shows how the measured results compare to the lnln mean average correlation.

The ln mean average method is an improved formula for predicting the viscosity of binary mixtures first postulated by Arrenius in 1887. This empirical formula is represented by the equation:

$$ln\eta = x ln\eta_1 + (1-x) ln h_2$$

where:
  $ln\eta$ = natural logarithm of the viscosity of the mixture
  $ln\eta_1$ = natural logarithm of the viscosity of component 1
  $ln\eta_2$ = natural logarithm of the viscosity of component 2
  x = fraction of component 1, expressed as either volume, weight or molar percent
  1−x = fraction of component 2, expressed as either volume, weight or molar percent In general it has been found that the degree of departure from the linear law becomes more and more pronounced as the difference between the viscosities of the components of the mixture become greater and greater. Moreover, it has been found that while the Arrenius formula, or ln mean average formula, provides a more accurate means for predicting the viscosity of the mixture, even this approach becomes less and less reliable when the difference in the component viscosities is greater than a factor often. In this regard, is has been reported that use of the following lnln mean average formula provides a greater degree of reliability for cases where the difference in the component viscosities is greater than one order of magnitude:

$$ln(ln\eta) = x ln(ln\eta_1) + (1-x) ln(ln\eta_2)$$

"Standard deviation" has been used to provide a quantitative measure of the extent to which a given blend of two asphalt materials departs from the conventional laws of blending and, thus, to provide a physical measure of the effects of thixotropy on the Theological behavior of shale oil modified asphalts. As used herein, standard deviation is defined by the following relationship:

$$SD = \sqrt{\sum_{i=1}^{N} (\Delta\eta_i)^2 / N}$$

where:
  SD = standard deviation in poise
  $\Delta\eta_i$ = difference between the measured viscosity of the binary blend, at composition i, and the predicted viscosity for the same composition obtained from use of either the ln or lnln mean average correlation N=total number of measured viscosity values for each binary blend.

In comparing the results of the viscosity measurements performed on the binary blends of the Sinclair AC-10 and AC-20 asphalts, in each case, the standard deviations are on the order of 1% of the average of the two constituent viscosities (i.e., 1% of approximately 1500 poise). These results are shown in FIGS. 1 and 2 for the ln and lnln mean average correlation comparisons, respectively. Thus for these asphalts, both the ln and lnln mean average correlations provide a reasonably accurate means for predicting the viscosity of the blends. The use of the lnln mean average formula does not provide any improvement over use of the ln mean average formula. As will be shown later, the lnln mean average correlation provides more accurate predictions for cases where the viscosities of the constituents of the binary blend vary by more than one order of magnitude. Hence, and due to the fact that the difference between the viscosities of the two constituent Sinclair asphalts is considerably less than one order of magnitude, no appreciable difference between the predictive capability of the two correlations should be expected.

Figure 3:
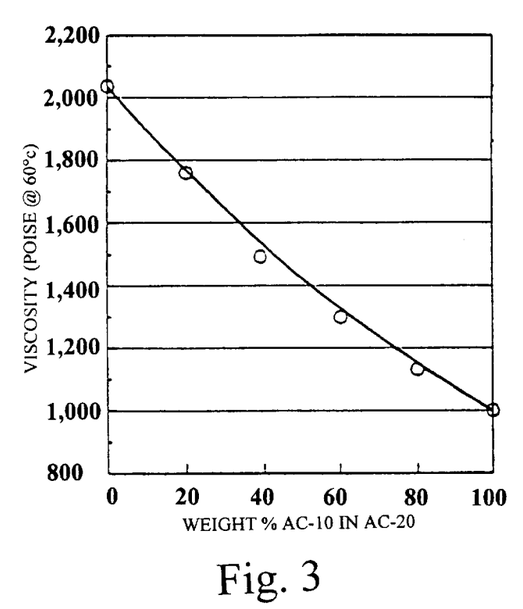
FIG. 3 is a graph of the ln mean average of viscosity of various AC-10 and AC-20 asphalt concrete blends from the Frontier refinery in Casper, Wyo. as a function of the weight percentage of AC-10 in the blend compared with measured viscosity (○) at select blends.
Figure 4:
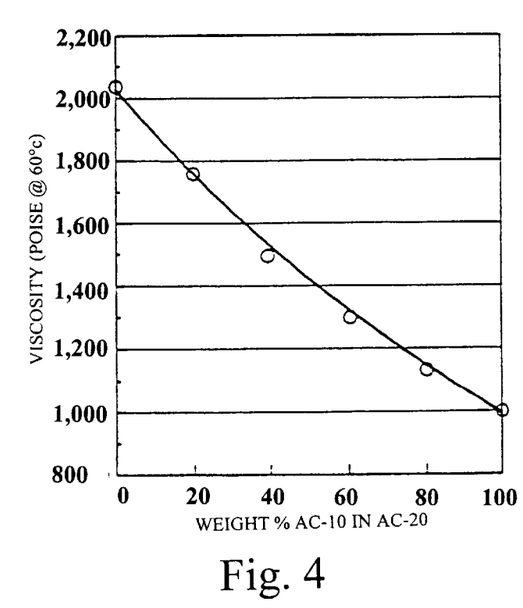
FIG. 4 is a graph of the lnln mean average of viscosity of various AC-10 and AC-20 asphalt concrete blends from the Frontier refinery in Casper, Wyo. as a function of the weight percentage of AC-10 in the blend compared with measured viscosity (○) at select blends.

Similar results were obtained for the binary blends of the Frontier AC-10 and AC-20 asphalts. These results are shown in FIGS. 3 and 4 for the ln and lnln mean average correlation comparisons, respectively.

Here again, and while the standard deviations are somewhat higher than was the case for the Sinclair asphalt blends, the standard deviations for both the ln mean average correlation (FIG. 3) and the lnln mean average correlation (FIG. 4) are approximately two orders of magnitude less than the average viscosities of the constituent asphalts. Moreover, the use of the lnln mean average correlation again provides little improvement over the ln mean average correlation.

These results, therefore, indicate that these two sources of conventional viscosity graded asphalts behave in reasonable accord with the conventional blending laws for predicting the viscosity of binary asphalt blends. As such, these data and associated comparisons would indicate that the Sinclair and Frontier AC-10 and AC-20 asphalts tested in this study demonstrate very little, if any, thixotropic behavior.

SOM Blends

For this series of tests, three SOM's were selected; a high viscosity SOM measuring approximately 3300 poise, an intermediate viscosity SOM measuring approximately 1300 poise, and a low viscosity SOM measuring approximately 57 poise. The high and low viscosity SOM materials were also used to prepare two additional SOMs: one having a measured viscosity of approximately 235 poise and one having a measured viscosity of approximately 540 poise.

The use of these selected SOM materials for this study is important because these materials represent a relatively wide range of viscosities and, therefore, are representative of materials that have experienced varying degrees of processing (i.e., polymerization by dehydrogenation). Hence, and in accordance with the earlier discussion regarding the probable effect of this processing method on the thixotropic properties of the SOM materials, it was important to select a fairly wide range of materials in order to increase the probability that a discernable effect due to thixotropy could be detected and quantified.

Figure 5:
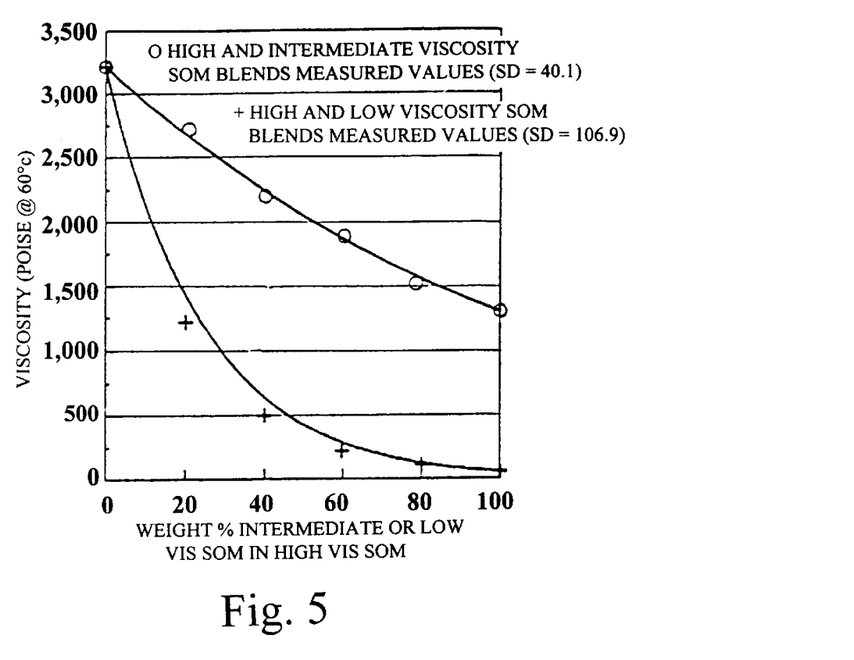
FIG. 5 is a graph of the ln mean average of the viscosity of a first series of various blends of high and intermediate viscosity SOM and high and low viscosity SOM having varying viscosities as a function of the weight percentage of the lower viscosity SOM in the blends compared with measured viscosity at select blends.
Figure 6:
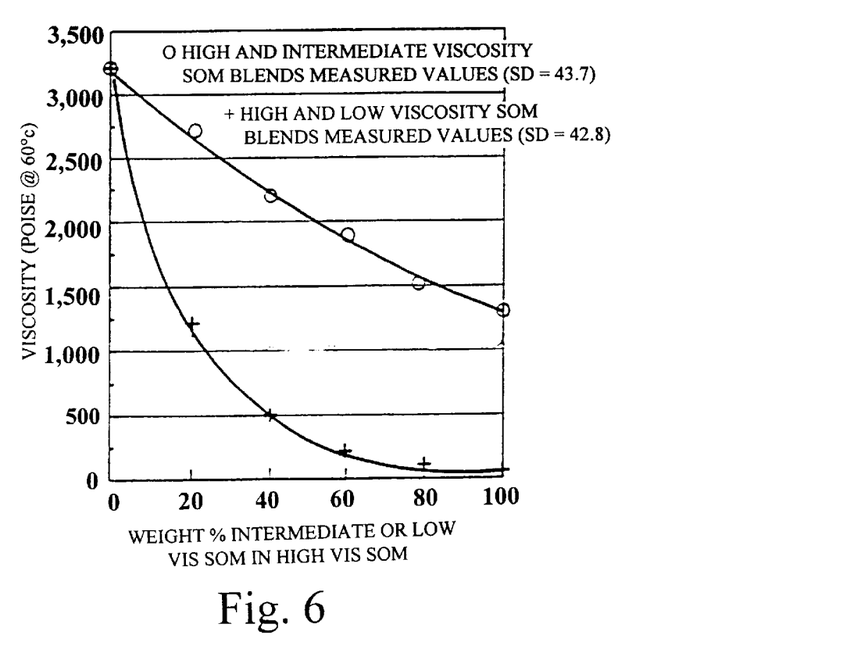
FIG. 6 is a graph of the lnln mean average of the viscosity of a first series of various blends of high and intermediate viscosity SOM and high and low viscosity SOM having varying viscosities as a function of the weight percentage of the lower viscosity SOM in the blends compared with measured viscosity at select blends.

The results from the first series of viscosity measurements that were performed on these SOM materials are shown in FIGS. 5 and 6. For this series, one set of binary blends was prepared from the high and intermediate viscosity SOM materials, while the second set was prepared from the high and low viscosity materials. FIG. 5 shows how the measured viscosities of these two sets of blends compares with the ln mean average correlation, while FIG. 6 shows the comparison relative to the lnln mean average correlation.

There is little difference between the standard deviations for the high/intermediate viscosity blends, when the measured viscosities of same are compared either on the basis of the ln mean average correlation (SD=40.1 poise) or the lnln mean average correlation (SD=43.7 poise). With regard to FIG. 5, there is a significant difference between the standard deviations for the high/intermediate viscosity blends (i.e., SD=40.1 poise) and the high/low viscosity blends (i.e., SD=106.9 poise). On the other hand, and as shown in FIG. 6, when the measured viscosities of these two sets of blends are compared against the lnln mean average correlation, there is little to distinguish between the standard deviations (i.e., SD=43.7 poise for the high/intermediate viscosity blends versus SD=42.8 poise for the high/low viscosity blends). The difference in the viscosities of the SOM materials used in the preparation of the high/intermediate viscosity blends is less than one order of magnitude, while that of the high/low viscosity blends is nearly two orders of magnitude. These observations suggest, therefore, that use of the lnln mean average correlation "effectively corrects" for the large difference in viscosity of the high and low viscosity SOM materials and, once having done so, provides a reasonable method for predicting the viscosity of a binary blend of SOM materials.

Figure 7:
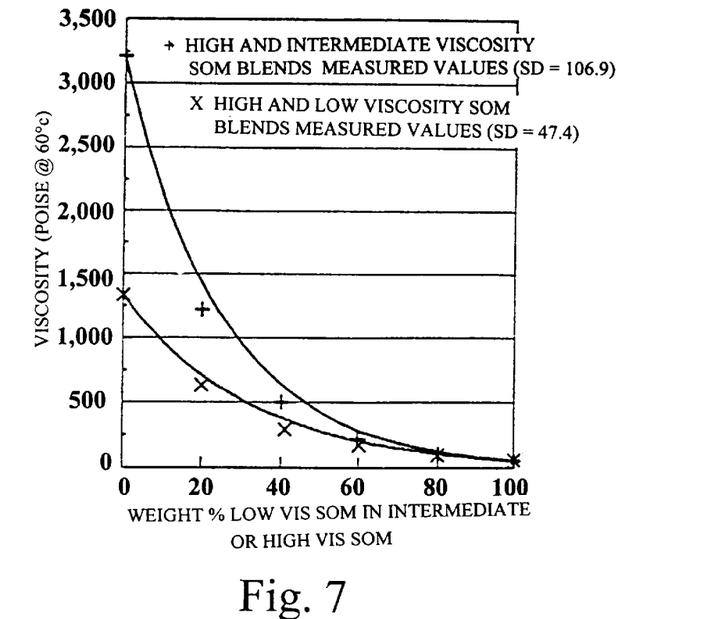
FIG. 7 is a graph of the ln mean average of the viscosity of a second series of various blends of high and intermediate viscosity SOM and high and low viscosity SOM having varying viscosities as a function of the weight percentage of the lower viscosity SOM in the blends compared with measured viscosity at select blends.
Figure 8:
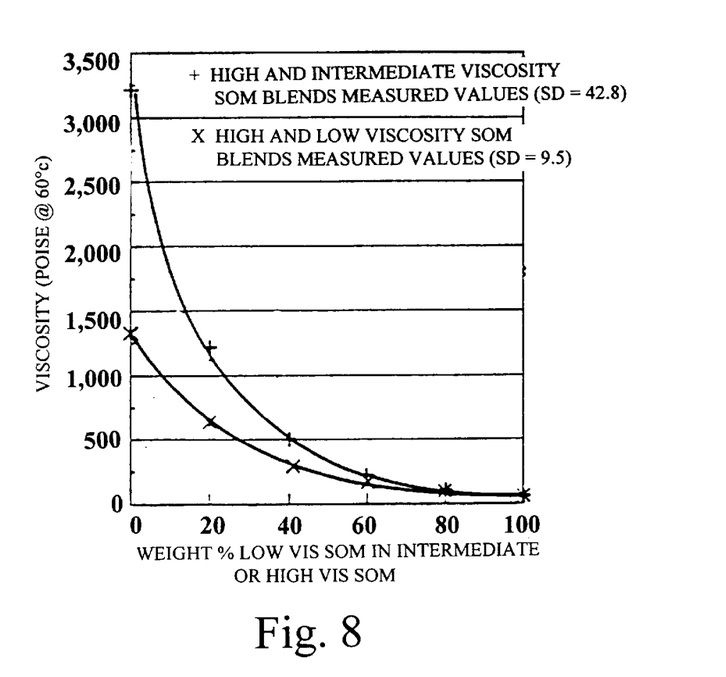
FIG. 8 is a graph of the lnln mean average of the viscosity of a second series of various blends of high and intermediate viscosity SOM and high and low viscosity SOM having varying viscosities as a function of the weight percentage of the lower viscosity SOM in the blends compared with measured viscosity at select blends.

FIGS. 7 and 8 show comparisons of high/low viscosities and intermediate/low viscosity SOM blends for the ln and lnln mean average correlations, respectively.

Here, the viscosities of the SOM components of the intermediate/low viscosity set of blends also vary by more than one order of magnitude. As such, and if the above cited observations hold true, the standard deviation for the intermediate/low viscosity blends should, as is the case for the high/low viscosity blends, improve when the measured values are compared to the predicted values obtained from the lnln mean average correlation. As seen from the standard deviation values shown in FIGS. 7 and 8, this observation again holds true, as the standard deviation for the intermediate/low viscosity blends improves from 47.4 poise, for the ln mean average comparison, to 9.5 poise for the lnln mean average comparison.

The above discussion in connection with FIG. 6 revealed that there was little difference between the standard deviations of the high/intermediate and high/low viscosity SOM blends when compared on the basis of the lnln mean average correlation. This is not the case, however, when the high/low and intermediate/low viscosity SOM blends are compared. As shown in FIG. 8, the standard deviation for the intermediate/low viscosity blends is significantly lower than that for the high/low viscosity blends (i.e., 9.5 poise versus 42.8 poise).

This observation suggests that, in the case of binary blends made from SOM materials, the deviation between measured and lnln mean average predicated viscosity values involves more than a simple correlation for the differences in the component viscosities. In this regard, it is the inventors contention that this deviation from the lnln mean average correlation also provides a measure of the non-Newtonian nature, and more specifically the thixotropic nature, of the SOM material. In support of this contention, note that the standard deviations for the above discussed lnln mean average comparisons become progressively higher as we move from the intermediate/low viscosity blends (i.e., SD=95. poise), to the high/low viscosity blends (i.e., SD=42.8 poise) and finally to the high/intermediate viscosity blends (i.e., SD=43.7 poise). This trend suggest that, consistent with the fact that airblowing residual shale oil feedstocks progressively increases the asphaltine fraction of the SOM materials, the standard deviation between the actual viscosity and the viscosity predicted by use of the lnln mean average correlation provides a means for qualitatively determining the effect of thixotropy on blends of asphalt materials derived from shale oil residuum feedstocks.

SOMAT Blends

For this series of tests, the SOMAT samples were prepared from the same Sinclair AC-10 and AC-20 asphalts and from the same SOM materials discussed earlier. The preparation and measurement of the SOMAT samples also employed the same protocols that were used for the AC and SOM samples, which protocols are described above. Also, and in the same manner employed in the preparation of the AC and SOM binary blends discussed earlier, the SOMAT blends were prepared in approximately 20% increments (i.e., 100% AC/0% SOM, 80% AC/20% SOM . . . 0% AC/100% SOM), by weight.

The first series of tests were performed on five sets of SOMAT blends made from the Sinclair AC-10 asphalt and five different viscosity SOM's (i.e., SOM's with measured viscosities of approximately 3300 (10), 1300 (12), 540 (14), 235 (16) and 57(18) poise at 60° C. (140° F.)). The second series of tests were performed on five sets of SOMAT blends made from the same five SOMs and the Sinclair AC-20 asphalt, and the corresponding curves have the same reference numbers as FIG. 9.

Figure 9:
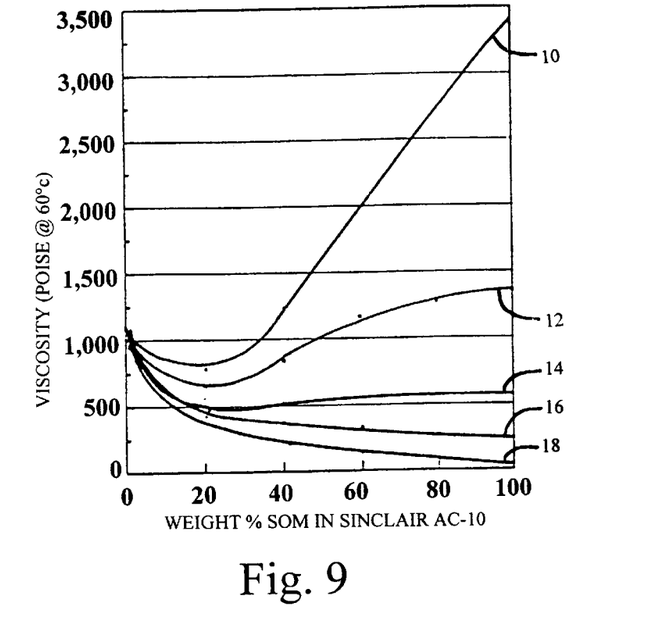
FIG. 9 is a graph of the measured viscosity of SOMAT blends made with Sinclair AC-10 asphalt concrete and varying percentages of SOM with five different viscosity SOMs.
Figure 10:
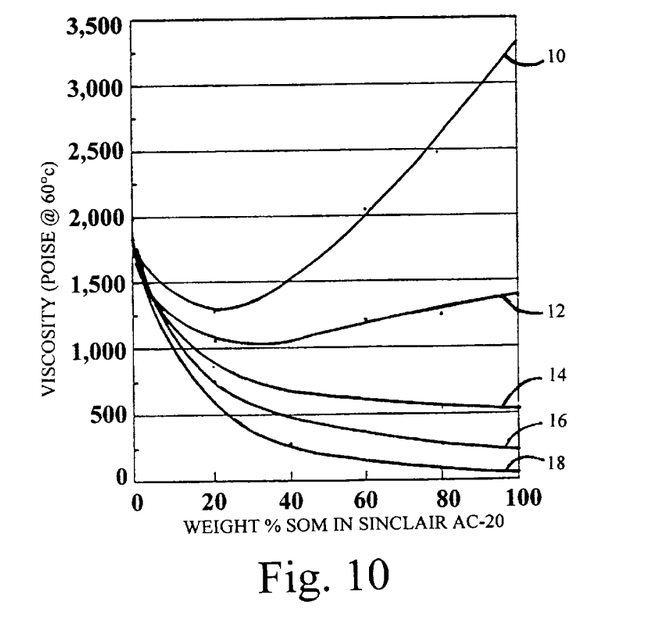
FIG. 10 is a graph of the viscosity of SOMAT blends made with Sinclair AC-20 asphalt concrete and varying percentages of SOM with five different viscosity SOMs.

In the interest of simplifying the discussion of the SOMAT test results and associated comparisons with the ln and lnln mean average correlations, the test results are first discussed qualitatively. In this regard, FIGS. 9 and 10 show the results from the viscosity measurements performed on each of the five sets of SOMAT blends. FIG. 9 shows the results for the SOMAT blends made with the Sinclair AC-10 asphalt and the five SOM's described above, while FIG. 10 shows the results for the SOMAT's made from the Sinclair AC-20 asphalt. Note that in each case, the curves were drawn through the measured viscosity points.

In examining the family of curves shown in FIG. 9 it can be observed that for all of the SOMAT blends other than the two made from the two lowest viscosity SOM's, there are several points on the curves where the viscosity of the SOMAT blend is lower than the viscosity of either the AC or the SOM components. These are examples of the "negative viscosity effect" that was noted above. This effect is most pronounced for SOMAT blends where the ratio of the constituents is approximately 20% SOM and 80% AC-10.

A similar pattern of behavior can be seen in FIG. 10 for the SOMAT blends made from the Sinclair AC-20 asphalt. Here again, but in this case for all but the three SOMAT blends made from the three lowest viscosity SOM's, there are several points on the curves which show the negative viscosity effect. Moreover, the effect again appears to be the most pronounced where the ratio of the constituents is approximately 20% SOM and 80% AC.

The quantitative results are obtained by comparing the measured results to the ln and lnln mean correlations through use of the standard deviation.

Figure 11:
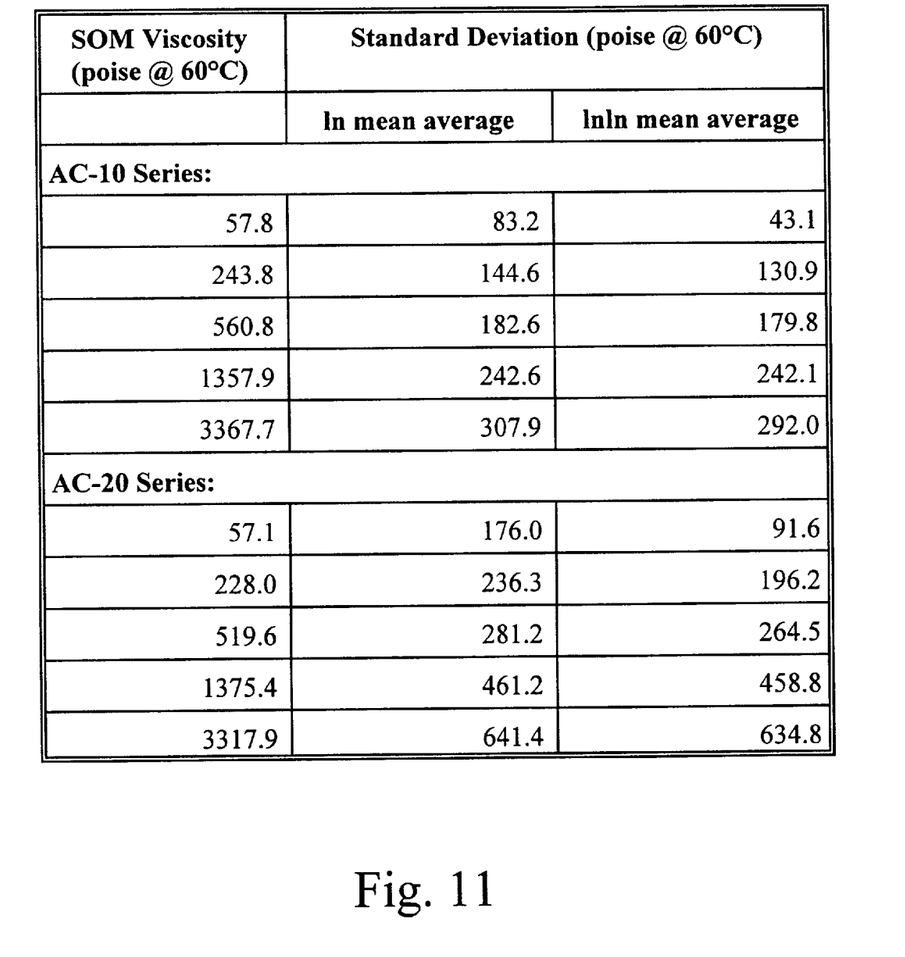
FIG. 11 is a table of the standard deviations for various SOMAT blends.

The standard deviations for each of the five sets of SOMAT blends for the AC-10 and AC-20 test series are shown in FIG. 11. For each SOMAT blend, the standard deviations between the measured viscosities and those obtained from the ln and lnln mean average correlations are shown, as is the measured viscosity of the SOM material used in the preparation of each SOMAT blend.

FIG. 11 demonstrates that the standard deviations for the SOMAT blends are as much as one order of magnitude greater than was observed with respect to either the AC or SOM blends, particularly in the case of the AC-20 series. The lnln mean average correlation provides a more accurate means for predicting the viscosity of these binary blends in comparison to the ln mean average correlation, particularly for those cases where the viscosities of the component AC and SOM materials are greater than one order of magnitude. The degree of this improvement is directly related to the magnitude of the difference between the viscosities of the component materials. For example, and in the case of the AC-10 series, the least amount of improvement that the lnln mean average correlation provides over the ln mean average correlation occurs for the SOMAT blend made from the 1357.9 poise SOM (i.e., SD=242.6 poise for the ln mean average correlation versus SD=242.1 poise for the lnln mean average correlation). Here, the ratio of the component viscosities is nearly equal (i.e., the viscosity of the AC-10 used for this SOMAT blend was 1087 poise). Contrast this with the case of the SOMAT blend made from the 57.8 poise SOM, where the greatest degree of improvement occurs (i.e., SD=83.2 poise for the ln mean average correlation versus SD=43.1 poise for the lnln mean average correlation), and where the difference in the viscosities of the component AC and SOM materials is greatest.

Unlike before, however, and for all but the SOMAT blend made from AC-10 and the lowest viscosity SOM, even the lnln mean average correlation fails to provide the same degree of accuracy evidenced earlier with respect to the AC and SOM blends. In addition, and for both the AC-10 and AC-20 series, the degree of accuracy clearly diminishes as the viscosity of the SOM used in the preparation of the SOMAT blend increases.

Figure 12:
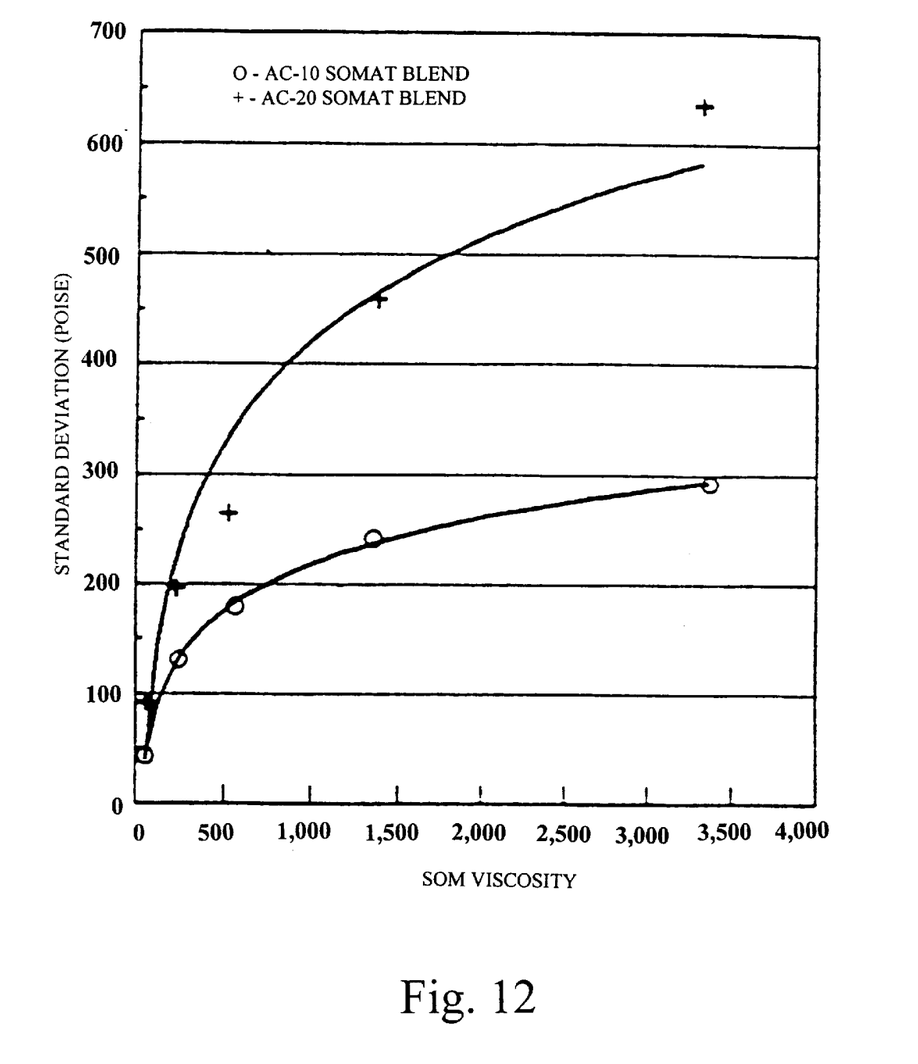
FIG. 12 illustrates the standard deviations from lnln mean average for various SOMAT blends made from Sinclair AC-10 (O) and AC-20 (+) asphalt concrete.

This later relationship is shown in FIG. 12 for the standard deviations between the measured viscosities and the viscosities predicted by use of the lnln mean average correlation. The standard deviations increase as the viscosity of the SOM materials used in the preparation of the SOMAT blends increases. Also, while the standard deviations for the AC-20 series are approximately twice as great as those for the AC-10 series, on a percentage basis they are approximately the same, since the viscosity of the AC-20 asphalt is approximately double the viscosity of the AC-10 asphalt (i.e., approximately 2000 poise versus 1000 poise).

With regard to the SOMAT blends, therefore, these observations lead to three principal conclusions. First, it is clear that, from a viscosity point of view, the behavior of the SOMAT material departs from that associated with either the AC or SOM materials from which the SOMAT is made. Secondly, the degree of this departure becomes progressively more pronounced as the viscosity of the SOM material used in the preparation of the SOMAT blend increases. More specifically, the actual viscosity of a given SOMAT blend is always less than that which is predicted by either the ln or lnln mean average correlation. In addition, the extent to which the actual viscosity of a SOMAT blend departs from either the ln or lnln mean average correlation is much greater than the degree of departure associated with the component AC and SOM materials, and becomes progressively more pronounced as the viscosity of the SOM component of the SOMAT blend increases. Lastly, the deviation between the actual and predicted viscosity values is greatest when the SOMAT is comprised of approximately 20% SOM and 80% AC asphalt, by weight, and that in certain cases the viscosity of the SOMAT blend is less than the viscosity of either the AC or SOM materials from which the SOMAT blend is made.

Here, each of the SOM's used in the preparation of the SOMAT blends discussed above were manufactured from the same shale oil residuum feedstock, which feedstock was processed (i.e., airblown) in the same equipment operated under approximately the same process conditions. Hence, it is obvious that there is a direct correlation between the degree (i.e., time) of processing required to reach a given SOM viscosity and the resulting impact of same on the viscosity behavior of the associated SOMAT product. It is believed that this effect is a direct result of the thixotropic properties that are associated with the SOM material, which thixotropic properties become progressively more pronounced as the degree of processing, as measured by the viscosity of the SOM material, increases. It is the inventor's contention that the degree to which these thixotropic properties affect the viscosity behavior of the associated SOMAT blends can be quantified by determining the difference between the actual viscosity of a SOMAT blend and the viscosity determined by conventional blending laws (i.e., by use of the ln or lnln mean average correlations).

Use of SOMAT with Recycle Asphalt Pavement

The negative viscosity effect discussed above with respect to the SOMAT blends prompted an investigation of whether SOMAT blends could be used effectively to restore the rheological properties of RAP to provide a low cost but durable HMAC containing RAP.

Two sources of RAP were used in the embodiments discussed below. One of the RAP materials was obtained from a stockpile located in western Colorado. The highway location from which this material originated is unknown. The second RAP material was obtained from the Wyoming Department of Transportation and originated from pavement cores removed from a section of Interstate 90 in northeastern Wyoming.

Initially, the aged asphalt binder material in the RAP was extracted and characterized This was accomplished by first extracting the asphalt binder from the asphalt-aggregate RAP mixture using Method A of ASTM D2172 (i.e., the centrifuge method, using trichloroethylene as the solvent). After sufficient quantities of the two RAP asphalts had been extracted, the viscosity of these materials was measured in accordance with the procedures set forth in ASTM D2171, with the exception that 60 minute soak times were used. The asphalt extracted from the western Colorado RAP had an absolute viscosity of 5,674 poise at 60° C. (140° F.), while the asphalt extracted from the Wyoming RAP had an absolute viscosity of 7,698 poise at 60° C. (140° F.).

These extracted RAP asphalts then were blended with shale oil modified asphalts or SOMAT's made from various proportions of conventional AC's and SOMs. In all cases, the SOMAT/RAP blend ratios were 52% SOMAT and 48% RAP, by weight. This blend ratio was selected as being typical for central plant recycle applications where approximately 40% RAP and 60% virgin aggregate are combined with virgin asphalt in the preparation of the new mix.

The proportion of SOM that was used in the preparation of the SOMAT blends was varied from zero to 25%, in approximately 5% increments, by weight (i.e., 0% SOM/100% AC, 5% SOM/95% AC, 10% SOM/90% AC . . . 25% SOM/75% AC). This range of SOM/AC proportions was selected primarily because it is typical of the ranges that were selected for use in field evaluations. Moreover, this range encompasses the SOM/AC proportions where the negative viscosity effect on the resulting SOMAT blend has been found to be the most pronounced.

The viscosities of the SOM materials used in the preparation of all of the SOMAT blends used were approximately 1200 to 1800 poise at 60° C. (140° F.). It should be noted that the test results presented herein are typical only for SOMAT blends made from these SOM materials and that different results would be obtained if different viscosity SOM materials were to be used.

Sample preparation and viscosity measurements were conducted as discussed above with respect to demonstration of the negative viscosity effect.

Figure 13:
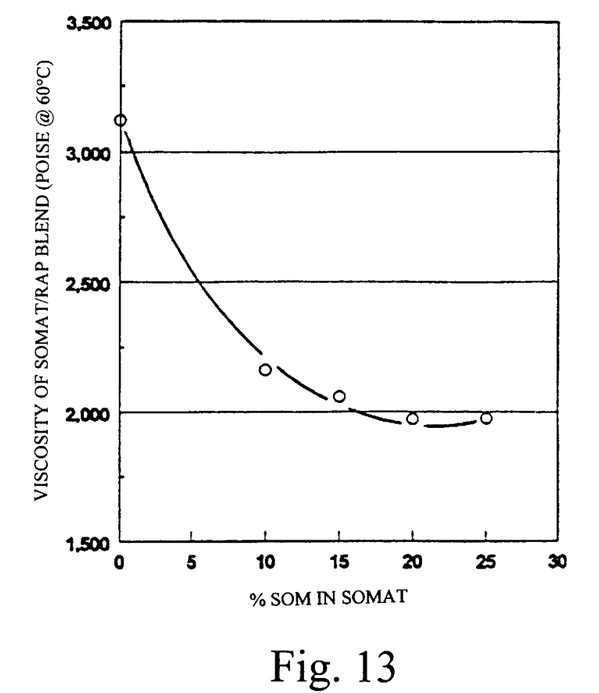
FIG. 13 is a graph of the measured viscosity of a shale oil modified asphalt/RAP as a function of percent of SOM in the shale oil modified asphalt using a RAP from western Colorado.

The first series of laboratory test results are shown in FIG. 13. In this case, the SOMAT blends were prepared from various proportions of a 1233 poise SOM material and a 1796 poise AC-20 asphalt cement obtained from the Sinclair refinery located in Sinclair, Wyo. These SOMAT blends were then combined with the asphalt extracted from the western Colorado RAP (viscosity 5674 poise) in the proportion of 52%/48%, by weight, respectively.

In the case where no SOM was used (i.e., where the final blend consisted of 52% unmodified AC-20 with 48% RAP asphalt), the viscosity of the combined AC-20 and RAP asphalt blend was approximately 3100 poise. As SOMAT is combined with the RAP asphalt, in the same respective proportions of 52%/48%, the viscosity of the SOMAT/RAP blend decreases as the SOM content of the SOMAT increases. The lowest viscosity is achieved when the ratio of the SOMAT constituents is approximately 20% SOM/80% AC-20.

The data shown in FIG. 13 demonstrate that, while the unmodified AC-20 asphalt was unable to restore the aged RAP asphalt to the equivalent of an AC-20 specification (i.e., 2000i400 poise), the SOMAT material was effective at doing so, even with the SOM content of the SOMAT was as low as 10%.

Figure 14:
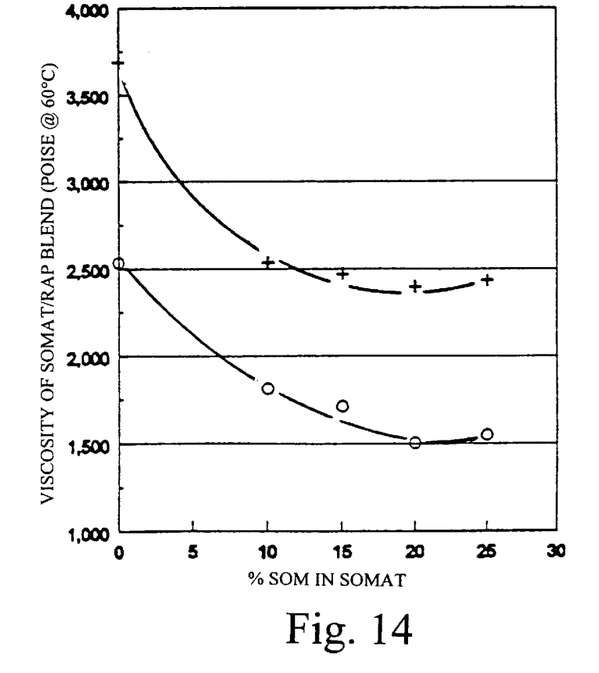
FIG. 14 is a graph of the measured viscosity of a shale oil modified asphalt/RAP as a function of percent of SOM in the shale oil modified asphalt using a RAP from a stretch of I-90 in northeastern Wyoming.

A second series of laboratory test results are shown in FIG. 14. Here again, SOMAT blends first were prepared from the AC and SOM materials in ratios ranging from 0% SOM/100% AC to 25% SOM/75% AC. In this case, however, two sets of SOMAT blends were prepared. One set was made with an AC-10 asphalt, while the second set was made from an AC-20 asphalt, both of which were obtained from the Sinclair refinery. Once these two sets of SOMAT blends had been prepared, each was blended with the asphalt extracted from the Wyoming I-90 RAP in the same percentages as discussed earlier (i.e., 52% SOMAT with 48% RAP asphalt).

The results from the viscosity measurements performed on these two sets of SOMAT/RAP blends are shown in FIG. 14. In one case, the viscosities of the AC and SOM materials used in the preparation of the SOMAT blends were 953 poise and 1268 poise, respectively. In the second case, the viscosities of the AC and SOM materials were 1861 poise and 1822 poise, respectively. In both cases, the viscosity of the RAP asphalt material was 7698 poise. Hence, the relationships shown in FIG. 14 essentially show the differences that result when the constituents of the SOMAT blend conform to AC-10 versus AC-20 viscosity specifications.

The relationships shown in FIG. 14 demonstrate essentially the same behavior as that seen earlier in connection with the western Colorado RAP illustrated in FIG. 13. That is, the viscosity of the SOMAT/RAP asphalt blends is significantly lower than the unmodified AC/RAP asphalt blends, regardless of whether an AC-10 or AC-20 asphalt is used in the preparation of the SOMAT material. Moreover, the degree of reduction in the viscosity of the combined SOMAT/RAP asphalt materials again is greatest when the SOM content of the SOMAT material is approximately 20%. In this case, however, it should be noted that, in order to restore this higher viscosity RAP asphalt material to an AC-20 specification, it is necessary to use an AC-10 asphalt in the preparation of the SOMAT material, whereas this specification was achieved by use of an AC-20 asphalt in the case of the lower viscosity western Colorado RAP material.

In summary, these laboratory test results show that, for the two RAP materials considered, SOMAT can be used as an effective rejuvenator. These results also show that the degree of rejuvenation is a function of the SOM content of the SOMAT material and is greatest when this content is approximately 20%. The degree of rejuvenation is also influenced by the viscosities of the SOM and AC asphalt materials used in the preparation of the SOMAT material.

Two field tests conducted to measure rejuvenation and evaluate wear and weather resistance are discussed below.

Field Test Results

EXAMPLE 1

A first field evaluation of the use of SOMAT in a recycle application was conducted at a test strip on U.S. Interstate 80 in Wyoming. The test sections were prepared by first milling approximately 7.62 cm (3 inches) off the existing pavement in the driving lane and filling the resulting trench with an overlay made with an unmodified AC-20 asphalt obtained from the Sinclair refinery. A nominal 3.81 cm (1.5 inch) HMAC containing RAP overlay, made from an AC-20 grade SOMAT binder was applied to the driving lane. The SOMAT used in this overlay consisted of 16.6 weight % SOM and 83.4 weight % AC-20 obtained from the same Sinclair refinery. The aggregate used in this 3.81 cm overly consisted of 70% virgin aggregate and 30% RAP obtained from the original pavement. As such, and after accounting for the oil content of the RAP, the SOM content of the final mix in the 3.81 cm overlay was equal to 10.14 weight %.

The control section for this test strip consisted of a polymer modified ("AC-20R") nominal 3.81 cm HMAC containing RAP overlay, which extended both to the east and west of the SOMAT 3.81 cm overlay, in the case of the driving lane, and throughout the project, in the case of the passing lane and parking lanes. The same aggregate content, consisting of 70% virgin aggregate and 30% RAP, was used for all of the AC-20R, 3.81 cm overlays and the AC-20R binder was obtained from the Sinclair refinery. With the exception of the driving lane, all of the 3.81 cm overlays were applied over the existing pavement.

Ten days after the 3.81 cm SOMAT overlay was applied, a nominal 1.91 cm (0.75 inch) PMWC overlay was applied to the original test strip. The SOMAT section of this PMWC overlay was applied to both the driving and parking lanes. The SOMAT binder used for this PMWC overlay consisted of a blend of 10.74 weight % SOM and 89.26 weight % AC-20 obtained from the Sinclair refinery. An AC-20R binder, obtained from the same Sinclair refinery, was used to prepare the PMWC that was applied to the remainder of the project No RAP was used in any of the PMWC overlays.

One (1) percent hydrated lime, by weight, was added to all of the polymer modified AC-20R mixes (i.e., for both the 3.81 cm and PMWC overlays) to improve the resistance to moisture damage, while no lime or other antistrip additives were added to any of the SOMAT mixes.

EXAMPLE 2

A second field evaluation of SOMAT in a recycle application was conducted on a test strip on U.S. Interstate 90 in Wyoming. The second test strip was constructed on the westbound driving lane of the Interstate. The test sections were prepared by first milling 10.16 cm (4 inches) off the existing pavement across the entire cross section of the Interstate. A nominal 10.16 cm (4 inch) overlay of HMAC containing RAP, made from an AC-20 grade SOMAT binder then was applied to the driving lane, passing lane and paved shoulders. The SOMAT used in this HMAC containing RAP overlay consisted of 10.1 weight % SOM and 89.9 weight % AC-20 obtained from the Sinclair refinery. The aggregate used in this HMAC containing RAP overlay consisted of 60% virgin aggregate and 40% RAP obtained from the original pavement.

The control section for this second test strip consisted of an unmodified AC-20, 10.16 cm HMAC containing RAP overlay, which extends both to the east and west of the SOMAT overlay. The same aggregate content, consisting of 60% virgin aggregate and 40% RAP, was used for all of the AC-20, 10.16 cm overlays and the AC-20 binder was obtained from the Sinclair refinery.

Once the application of the SOMAT/RAP and AC-20/RAP overlays was completed, a nominal 1.91 cm (0.75 inch) PMWC was applied throughout the entire length of the project. The PMWC was made from an unmodified Sinclair AC-20 binder and no RAP was used in the preparation of this mix.

Again, one (1) percent hydrated lime, by weight, was added to all of the unmodified AC-20 mixes (i.e., for both the 10.16 cm. and PMWC overlays) to improve resistance to moisture damage, while no lime or other antistrip additives were added to the SOMAT mix.

Analysis of Field Test Results

EXAMPLE 1 ANALYSTS

Rheological tests performed on the asphalts extracted from cores taken from the HMAC containing RAP overlays show a clear distinction between the SOMAT and AC-20R binders with respect to the ability of each to restore the Theological properties of the aged asphalt in the RAP. This difference is depicted in Table 1 below:

TABLE 1

| ASPHALT TYPE | VISCOSITY @ 25° C. ($10^3$ POISE) | VISCOSITY RATIO |
|---|---|---|
| SOMAT(NEAT) | 1.805 | 2.90 |
| SOMAT-RAP (AS CONST) | 5.241 | |
| AC-20R (NEAT) | 0.660 | 7.32 |
| AC-20R-RAP (AS CONST) | 4.830 | |
| SOMAT-PMWC (AS CONST) | 5.939 | 0.88 |
| SOMAT-RAP (AS CONST) | 5.241 | |
| AC-20R PMWC (AS CONST) | 2.934 | 1.65 |
| AC-20R-RAP (AS CONST) | 4.830 | |

Table 1 shows two types of comparisons. In the first comparison, the viscosities of the as constructed SOMAT/RAP and AC-20R/RAP asphalt binders are compared to the viscosities of the neat, or as supplied, SOMAT and AC-20R asphalts. These ratios of the post and preconstruction viscosities provide a measure of the relative ability of the binders to rejuvenate the aged asphalt in the RAP. As evidenced by the lower viscosity ratio for the SOMAT material (i.e., 2.90) in comparison to the AC-20R asphalt (i.e., 7.32), SOMAT clearly was the more effective in this regard. The ratios of these post and preconstruction viscosities also could be said to provide a measure of the degree of oxidation that occurred with these materials during their exposure to the elevated temperatures associated with the hot mix plant and laydown operations. However, it is fair to assume that the degree of oxidation attributable to these operations was nearly the same for both the SOMAT and AC-20R materials, meaning that these ratios are a reliable indicator of the relative ability of the binders to rejuvenate the aged asphalt in the RAP.

In the second and, arguably, more direct comparison shown in Table 1, the as constructed viscosities of the asphalts in the overlay containing RAP are compared to the as constructed viscosities of the asphalts used in the PMWC mixes, which mixes did not contain any of the RAP material. The only difference between these two overlays is the fact that one contains RAP while the other does not. The asphalt binders used in the overlays were handled in an identical manner and therefore would not experience any variation in the degree of oxidation. This comparison, therefore, provides a more direct measure of the ability of these two asphalts binders to rejuvenate the aged binder in the RAP. Here again, the lower viscosity ratio for the SOMAT material (i.e., 0.88) in comparison to the AC-20R asphalt (i.e., 1.65) demonstrates the effectiveness of the SOM when used in recycle applications.

EXAMPLE 2 ANALYSIS

Unfortunately, the tests performed at the site of Example 2 did not include the measurement of the viscosities of the as constructed binders and, as such, comparisons like those discussed above in connection with Example 1 are not possible. Nonetheless, and based on the preconstruction tests that were performed, the relative rejuvenation effectiveness of the SOMAT and unmodified AC-20 asphalts used in Example 2 can be inferred.

Referring to the measurements of FIG. 14, along with the fact that the SOMAT in Example 2 was comprised of 10.1% SOM and 89.9% Sinclair AC-20, it can be inferred that the viscosity of the combined SOMAT/RAP asphalt used at Example 2 was approximately 2500 poise compared to approximately 3700 poise in the case of the unmodified AC-20/RAP asphalt. The viscosity of the Sinclair AC-20 asphalt used in the preconstruction tests was 1861 poise, while the viscosity of the Sinclair AC-20 asphalt used in the preparation of the SOMAT blend that was supplied for the construction of the Example 2 test strip was 1850 poise. Hence, the inferred viscosities of the SOMAT/RAP and unmodified AC-20/RAP materials are not affected significantly by variations in the viscosity of the AC-20 material.

Figure 15:
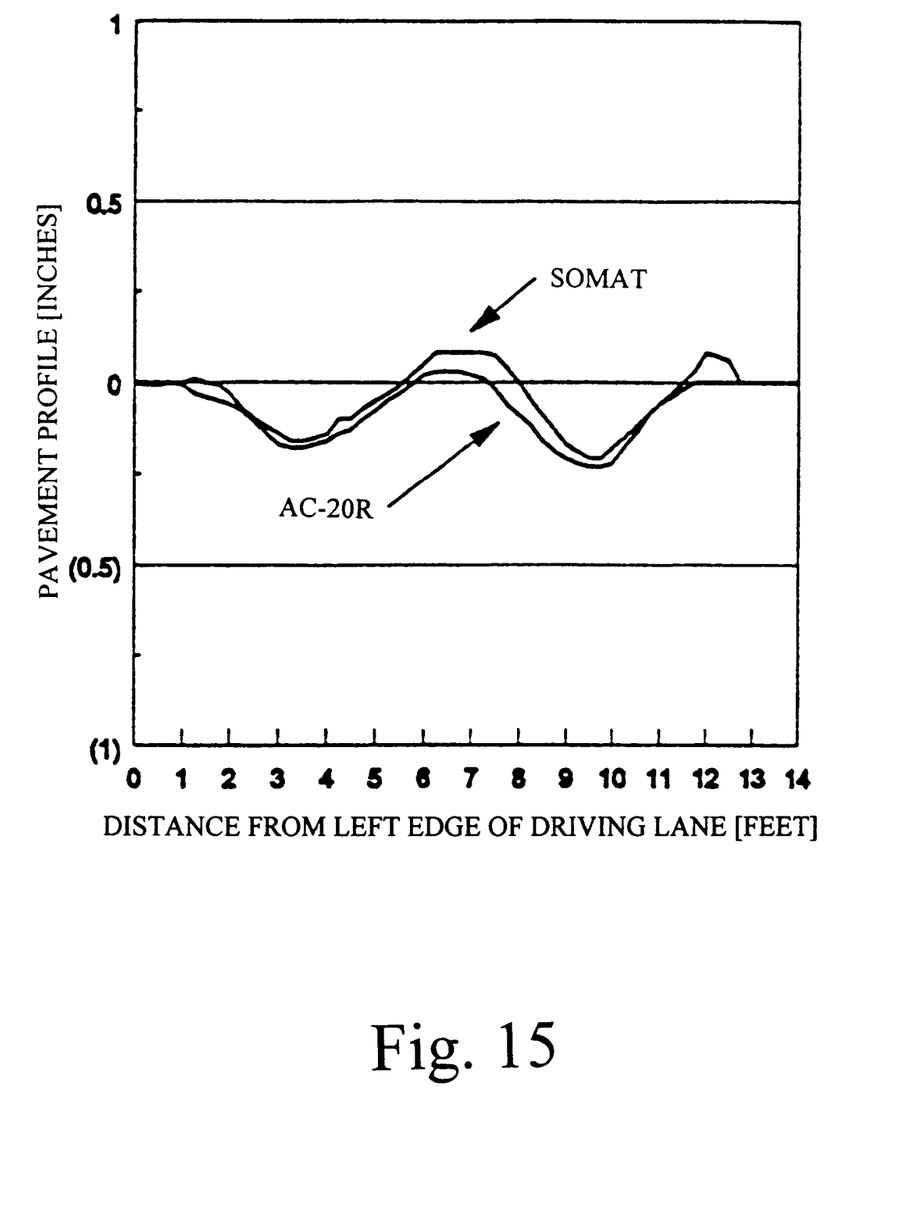
FIG. 15 is a graph of the rutting test results for the RAP of Example 1.

While the field test results from Examples 1 and 2 attest to the effectiveness of SOMAT as a rejuvenator for RAP asphalts, it is important to ensure that this effectiveness is not achieved at the expense of a loss of performance with regard to high temperature deformation, or rutting. FIG. 15 shows the results that were obtained from a series of transverse profilograph measurements that were performed on the Example 1 test strip after the test strip had been in service for five years. The transverse profilograph is an instrument that is used to map the pavement surface profile at right angles to the direction of traffic and, as such, provides a measure of the degree of movement that the pavement has incurred due to traffic loading.

As can be seen from the profile comparisons shown in FIG. 15, there is little to distinguish between the rutting performance of the SOMAT and polymer modified, AC-20R sections of the Example 1 test strip. In fact, both sections of the test strip are providing excellent protection against rutting, inasmuch as the depths of the wheel paths for both are less than 0.64 cm (0.25 inches) after approximately five years of service.

Similar comparisons are not presently available for the Example 2 test strip as this test strip has not been in service long enough. However, and in an attempt to gain some measure of the projected rutting performance of the mixes used at the Example 2 test strip, these mixes were evaluated by use of the Georgia Loaded-Wheel Tester ("GLWT").

In preparation for the GLWT tests, samples of the SOMAT/RAP and unmodified AC-20/RAP mixes were collected from behind the paver during the construction of the test strip of Example 2. These samples were then transported to the laboratory, whereupon they were heated and then compacted with a California Kneading Compactor. Once the samples were compacted and had cured for a period of 24 hours, they were tested in the GLWT at a temperature of 46.1° C. (1 15° F.). The rut depth measurements were taken and compared after 1000, 4000 and 8000 cycles.

The results from the GLWT tests that were performed on the SOMAT1RAP and unmodified AC-20/RAP mixes are shown in Table 2 below:

TABLE 2

| MIX TYPE | RUT DEPTH (CM) | | |
|---|---|---|---|
|  | 1000 CYCLES | 4000 CYCLES | 8000 CYCLES |
| SOMAT/RAP | 0.256 | 0.354 | 0.424 |
| AC-20/RAP | 0.287 | 0.395 | 0.480 |

While the rutting resistance of the SOMAT/RAP mix is slightly better than the unmodified AC-20/RAP mix, essentially there is little to distinguish between the rutting performance of these two mixes.

When these test results are viewed in the context of the relative viscosities of the SOMAT and unmodified AC-20 binders used in Example 2, the SOMAT binder was far more effective at lowering the viscosity of (i.e., rejuvenating) the aged asphalt in the RAP in comparison to the unmodified AC-20 binder without incurring a reduction in the level of rutting resistance.

Resistance to moisture damage was also evaluated. With regard to Example 1, no quantitative tests have been performed to measure their resistance to moisture damage. A qualitative inspection of the pavement cores removed from the test strip after five years of service shows no signs of stripping in either the SOMAT PMWC overlay or the AC-20R/lime PMWC overlay. On the other hand, the underlying overlays, which overlays contain the RAP material, show slight indications of stripping after five years of service; however, there is little to distinguish in the degree of stripping between the SOMAT and AC-20R/lime mixes.

A more quantitative measure of stripping performance was obtained for the mixes used in the construction of the Example 2 test strip. Samples of the as constructed SOMAT/ RAP and unmodified AC-20/RAP mixes were collected and tested in accordance with the procedures set forth in AASHTO T-283 (also known as the modified Lottman, or freeze-thaw, test). Under this procedure, the mix specimen is compacted to a total air void range of approximately 7%. The specimen is then vacuum saturated with water until approximately 70% of the voids are filled. The specimen is then placed in a sealed container to prevent any loss of moisture, whereupon it is subjected to one freeze-thaw cycle. This cycle consists of lowering the temperature of the specimen to −23.3° C. (−10° F.), holding the specimen at this temperature for a period of 16 hours, then raising the temperature of the specimen to room temperature, at which temperature it must remain for a period of eight hours prior to testing. The indirect tensile strengths of the specimen that has been subjected to the freeze-thaw cycle and of a specimen that has not are then measured. The ratio of these two indirect tensile strengths, call the TSR, provides a measure of the retained strength of the mix after being subjected to one freeze-thaw cycle. This procedure is commonly used to provide a measure of the ability of an asphalt mix to resist moisture damage.

The results of the AASHTO T-283 tests performed on the Example 2 mixes containing RAP are shown in Table 3 below:

TABLE 3

| | TSR (%) | |
|---|---|---|
| TEST NO. | SOMAT/RAP MIX | AC-20/RAP MIX |
| 1 | 96.0 | 89.3 |
| 2 | 87.1 | 83.1 |
| 3 | 92.7 | 80.4 |
| AVERAGE | 91.9 | 84.3 |

Here the results from a series of three tests, and the average of same, are shown for the SOMAT/RAP and unmodified AC-20/RAP mixes. These results show that a higher level of resistance to moisture damage (i.e., higher TSR values) were demonstrated by the SOMAT specimens in comparison to the unmodified AC-20 specimens, even though the later had been treated with hydrated lime—a method commonly used to improve the pavements resistance to moisture damage.

The example field test results confirm that SOMAT can be used as an effective rejuvenater for central plant recycle applications. These results also demonstrate that the use of SOMAT as a rejuvenater can be accomplished without a loss in performance with regard to rutting and with resistance to moisture damage comparable or better than that which can be achieved through the use of hydrated lime.

What is claimed is:

1. A method of making a shale oil modifier comprising:

(a) providing a crude shale oil;

(b) subjecting the crude shale oil to a two stage distillation wherein the second stage is vacuum distillation and collecting the residual fraction; and (c) dehydrogenating the residual fraction of step (b) with air until a viscosity of about 1200–1800 poise at 60° C. of the dehydrogenated fraction is achieved.

2. The method of claim 1 wherein in step (c) the viscosity is between about 1233–1268 poise at 60° C.

3. The method of claim 1 further comprising in step (b) producing a residual fraction having an initial boiling point between about 260° C.–290° C.

4. The method of claim 1 wherein in step (c) the dehydrogenation occurs at about 218° C. (425° F.).

* * * * *